(12) United States Patent
Li

(10) Patent No.: US 12,330,565 B2
(45) Date of Patent: Jun. 17, 2025

(54) TWO-SUCTION-CUP VEHICLE-MOUNTED SUPPORT FIXING DEVICE

(71) Applicant: Dongguan Winking Technology Co., Ltd, Dongguan (CN)

(72) Inventor: Zhixuan Li, Dongguan (CN)

(73) Assignee: Dongguan Winking Technology Co., Ltd, Dongguan (CN)

( * ) Notice: Subject to any disclaimer, the term of this patent is extended or adjusted under 35 U.S.C. 154(b) by 158 days.

(21) Appl. No.: 18/138,571

(22) Filed: Apr. 24, 2023

(65) Prior Publication Data

US 2023/0356668 A1    Nov. 9, 2023

(30) Foreign Application Priority Data

May 5, 2022    (CN) .......................... 202221057176.7

(51) Int. Cl.
*B60R 11/00* (2006.01)

(52) U.S. Cl.
CPC ....... *B60R 11/00* (2013.01); *B60R 2011/0056* (2013.01); *B60R 2011/008* (2013.01)

(58) Field of Classification Search
CPC .... B60R 2011/0056; B60R 2011/0068; F16M 13/02; F16M 13/022
USPC .... 224/559; 248/205.5, 205.8, 206.2, 206.3; D14/253
See application file for complete search history.

(56) References Cited

U.S. PATENT DOCUMENTS

| | | | | |
|---|---|---|---|---|
| 1,298,139 | A * | 3/1919 | Wolcott | F16B 47/00 292/DIG. 28 |
| 2,910,264 | A * | 10/1959 | Lindenberger | F16B 47/00 248/362 |
| 3,514,065 | A * | 5/1970 | Donaldson | F16B 47/00 248/363 |
| 8,128,042 | B1 * | 3/2012 | Chen | F16B 47/006 248/205.5 |
| 8,235,337 | B2 * | 8/2012 | Ostendarp | F16B 47/006 248/205.8 |
| 8,356,781 | B2 * | 1/2013 | Chen | F16B 47/006 248/205.8 |
| 8,387,932 | B2 * | 3/2013 | Takahashi | F16B 47/006 248/205.5 |
| 8,496,222 | B2 * | 7/2013 | Li | F16M 13/022 248/205.5 |
| 8,740,161 | B2 * | 6/2014 | Hsu | F16M 11/14 248/205.8 |
| 8,919,712 | B2 * | 12/2014 | Chen | F16B 47/006 248/205.8 |

(Continued)

*Primary Examiner* — Justin M Larson
(74) *Attorney, Agent, or Firm* — Hemisphere Law, PLLC; Zhigang Ma

(57) ABSTRACT

The present disclosure discloses a two-suction-cup vehicle-mounted support fixing device, including a mounting seat and a suction cup main body; a cylinder channel is formed in the mounting seat; a pressure valve switch is arranged in the cylinder channel; one end of the suction cup main body is embedded to a bottom of the mounting seat, and the other end of the suction cup main body extends into the cylinder channel and is hinged with the pressure valve switch; the suction cup main body includes an outer suction cup and at least one inner suction cup located on an inner side of the outer suction cup; a pull handle is also arranged on one side of the suction cup main body; and a support connector is arranged at one end of the mounting seat.

6 Claims, 9 Drawing Sheets

(56) References Cited

U.S. PATENT DOCUMENTS

| | | | |
|---|---|---|---|
| 9,145,913 B2* | 9/2015 | Song | F16B 47/00 |
| 10,641,314 B1* | 5/2020 | Fan | F16B 47/006 |
| 11,667,249 B2* | 6/2023 | Kipper | F16M 11/10 |
| | | | 248/205.5 |
| 2002/0190170 A1* | 12/2002 | Ting | E03C 1/06 |
| | | | 248/205.5 |
| 2006/0138292 A1* | 6/2006 | Yang | F16B 45/00 |
| | | | 248/206.3 |
| 2008/0251664 A1* | 10/2008 | Hara | F16B 47/00 |
| | | | 248/205.8 |
| 2012/0120626 A1 | 5/2012 | Akaike | |
| 2014/0346295 A1* | 11/2014 | Song | A42B 3/006 |
| | | | 248/205.8 |
| 2020/0015379 A1 | 1/2020 | Fukuda | |
| 2020/0262358 A1 | 8/2020 | Ishimura | |
| 2023/0356668 A1* | 11/2023 | Li | B60R 11/00 |

* cited by examiner

TWO-SUCTION-CUP VEHICLE-MOUNTED SUPPORT FIXING DEVICE

TECHNICAL FIELD

The present disclosure relates to the technical field of vehicle-mounted support fixing devices, in particular to, a two-suction-cup vehicle-mounted support fixing device.

BACKGROUND

Vehicle-mounted supports can be used to fix sports cameras, mobile phones, decorations, perfume, and the like. Existing vehicle-mounted supports are generally divided into three types: a clip type, an adhesive type, and a suction cup type. A suction cup type fixing support uses power of a suction cup to suck a support main body to a smooth surface in a vehicle, such as glass and a decorative dashboard. However, vehicles are prone to bump during driving. Traditional suction cup type vehicle-mounted supports all include a single suction cup. The suction cup will be softened and leak air due to long-time bumping, or aging in the sunlight, or insolation, so that it is easy for the support to fall off because the suction cup loses its effect. Unnecessary traffic accidents will be possibly caused if the support falls off in the driving process. This patent provides a suction cup type fixing device for a vehicle-mounted support, which provides a two-suction-cup structure and includes a pull handle and a pressure valve switch. Compared with a traditional suction cup fixing device, this suction cup type fixing device is firmer in suction, and the suction disk structure is more stable.

SUMMARY

In order to overcome the shortcomings in the prior art, the present disclosure aims to provide a two-suction-cup vehicle-mounted support fixing device, to solve the technical problems mentioned in the background.

In order to solve the technical problems, the present disclosure adopts the following technical solution:

A two-suction-cup vehicle-mounted support fixing device includes a mounting seat and a suction cup main body; a cylinder channel is formed in the mounting seat; a pressure valve switch is arranged in the cylinder channel; one end of the suction cup main body is embedded to a bottom of the mounting seat, and the other end of the suction cup main body extends into the cylinder channel and is hinged with the pressure valve switch; the suction cup main body includes an outer suction cup and at least one inner suction cup located on an inner side of the outer suction cup; a pull handle is also arranged on one side of the suction cup main body; and a support connector is arranged at one end of the mounting seat.

In a further improvement, the support connector is a ball-end connector.

In a further improvement, a reset spring is arranged between the suction cup main body and the mounting seat.

In a further improvement, the suction cup main body further includes a pulling pillar and a pulling disk; the pulling pillar is fixedly connected with the pulling disk; a disk cavity is also formed in a position, corresponding to the pulling disk, on the outer suction cup; the pulling disk is embedded into the disk cavity; an upper end of the pulling pillar extends into the cylinder channel; a first hinge hole is formed in an upper end of the pulling pillar; the pressure valve switch is provided with a second hinge hole at a position corresponding to the first hinge hole; a plug pin hinges the pressure valve switch with the pulling pillar through the first hinge hole and the second hinge hole; and the reset spring sleeves the pulling pillar.

In a further improvement, the outer suction cup is provided with a fixing screw hole in one side close to the pull handle; the inner suction cup is provided with a pull handle connecting band at a position corresponding to the fixing screw hole; a round hole is formed in the pull handle connecting band; and a screw passes through the round hole and the fixing screw hole to achieve serial connection of the pull handle of the outer suction cup and the inner suction cup, to facilitate taking down the outer suction cup and the inner suction cup simultaneously.

In a further improvement, the pressure valve switch includes a squeeze supporting surface located on one side of the second hinge hole, and a raise supporting surface opposite to the squeeze supporting surface; a supporting point is formed between the squeeze supporting surface and the raise supporting surface; and a distance from the squeeze supporting surface to an axis of the second hinge hole is greater than a distance from the raise supporting surface to the axis of the second hinge hole. The two-suction-cup vehicle-mounted support fixing device further includes a handle located on the other side of a squeeze region; the mounting seat is provided with a clamping slot in a position corresponding to the handle; the handle is provided with a bent portion which can be clamped into the clamping slot in an upper end of the mounting seat; and a supporting platform for supporting the squeeze supporting surface or the raise supporting surface is also arranged on one side of the cylinder channel, and is located on two sides of an axis of the cylinder channel.

Compared with the prior art, the present disclosure has the beneficial effects below:

(1) By the arrangement of the two suction cups, the present disclosure solves the problem that a support often falls off due to air leakage of a single suction cup.

(2) The two-suction-cup structure of the present disclosure is more stable and reliable. The inner suction cup can still work without falling off even if the outer suction cup leaks air.

(3) By the arrangement of a pressure valve, an inner and outer suction cup pull handle, and a pull handle connecting band, suction and release can be quickly achieved, which is very convenient to use.

Figure 1:
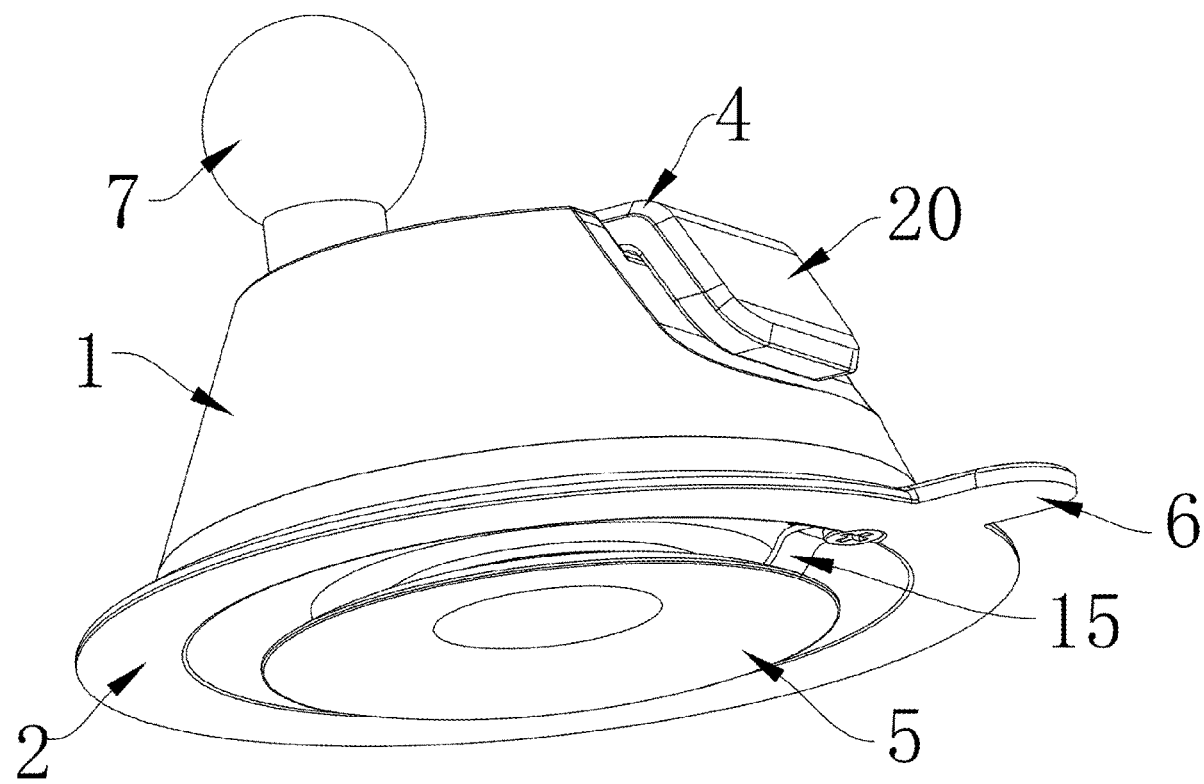
FIG. 1 is a schematic three-dimensional diagram of a bottom view of the patent of the present disclosure.

In the drawings: mounting seat; 2: outer suction cup; 3: cylinder channel; 4: pressure valve switch; 5: inner suction cup; 6: pull handle; 7: support connector; 8: reset spring; 9: pulling pillar; 10: pulling disk; 11: disk cavity; 12: first hinge hole; 13: second hinge hole; 15: pull handle connecting band; 17: squeeze supporting surface; 18: raise supporting surface 19: supporting point; 20: handle; 21: clamping slot; 22: bent portion; 23: supporting platform; and 14: plug pin.

DETAILED DESCRIPTION OF THE EMBODIMENTS

The present disclosure is further described below in combination with accompanying drawings and specific implementations. It should be noted that the various embodiments or technical features described below can be arbitrarily combined to form new embodiments without conflicts.

Figure 2:
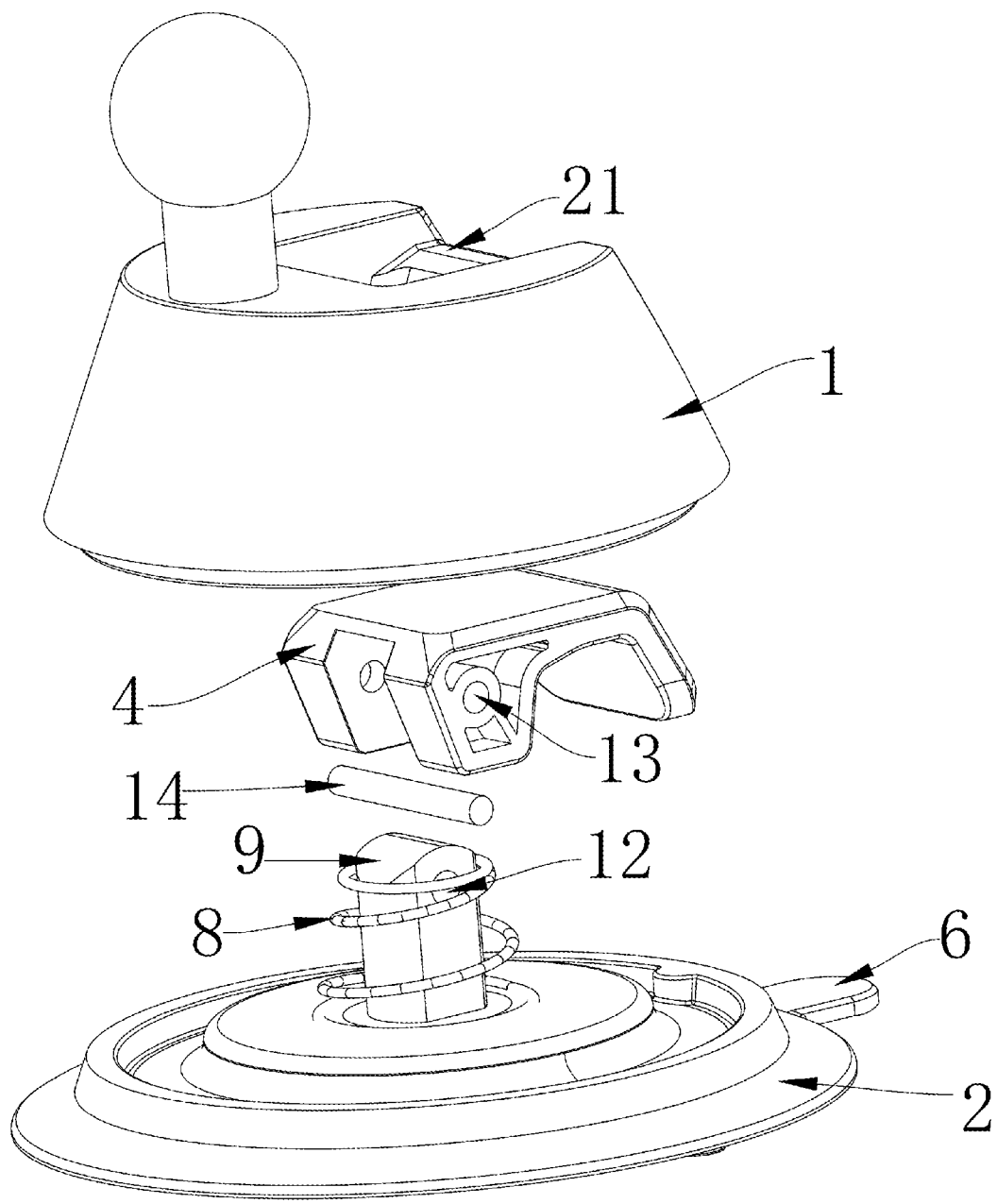
FIG. 2 is a three-dimensional exploded diagram I of a front view of the patent of the present disclosure.
Figure 3:
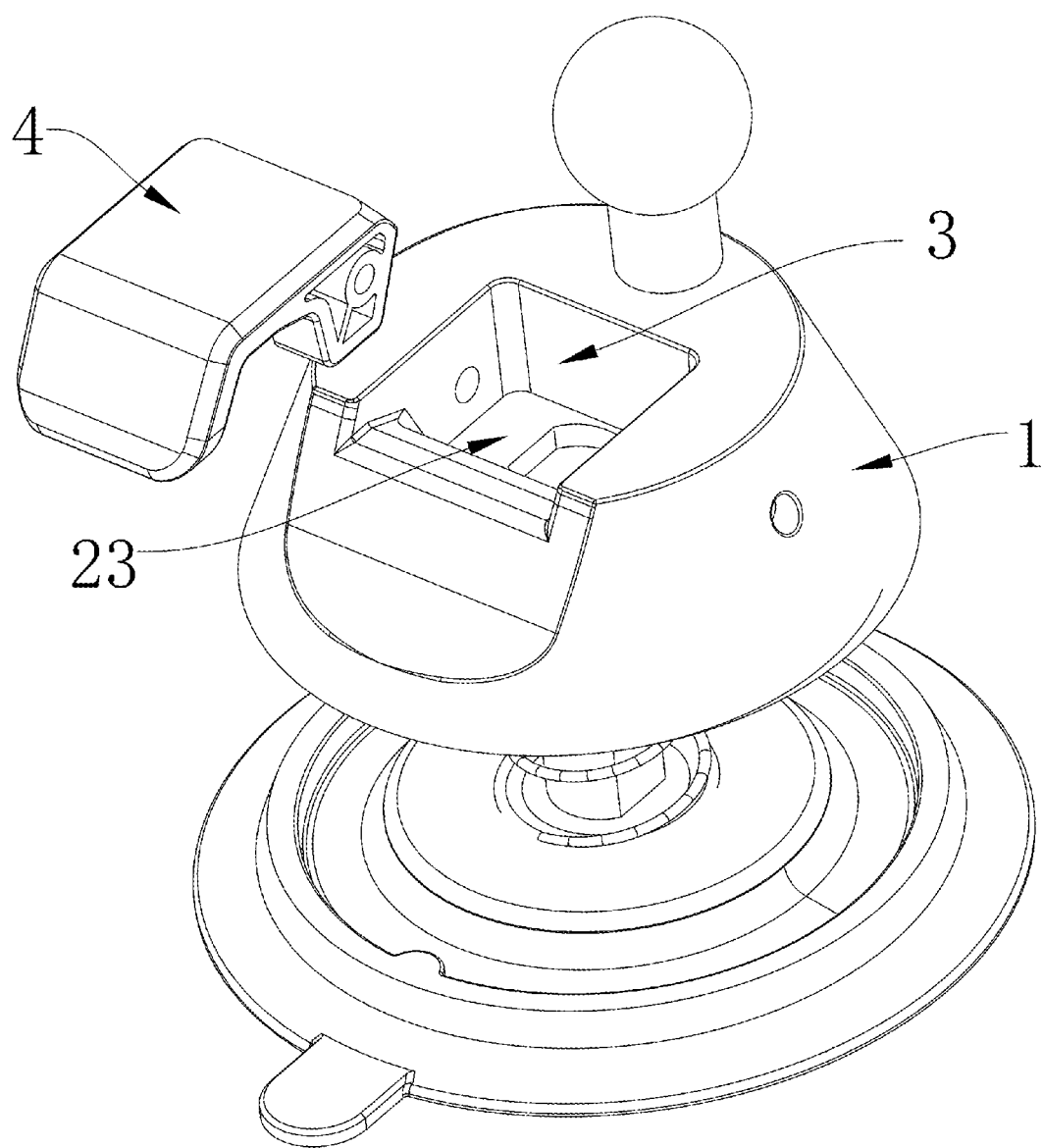
FIG. 3 is a three-dimensional exploded diagram II of a front view of the patent of the present disclosure.
Figure 4:
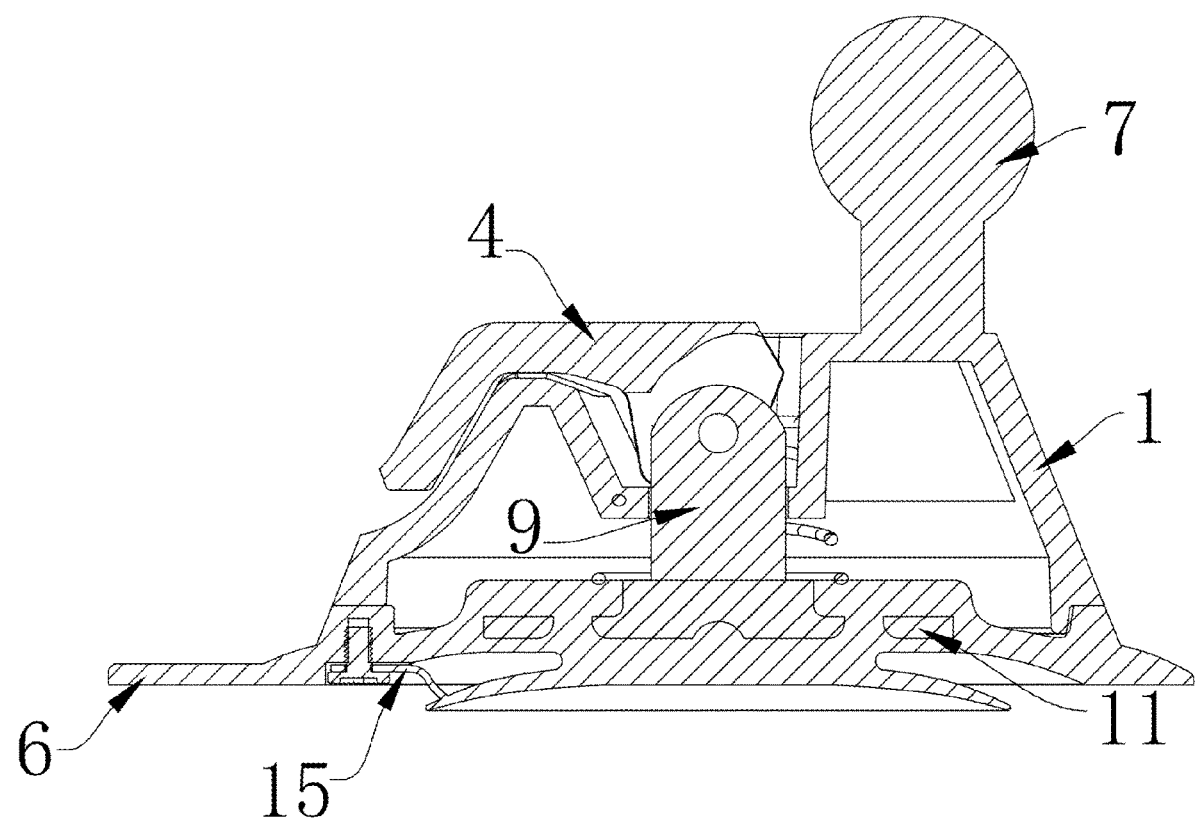
FIG. 4 is a schematic sectional diagram of a side view of the patent of the present disclosure.
Figure 5:
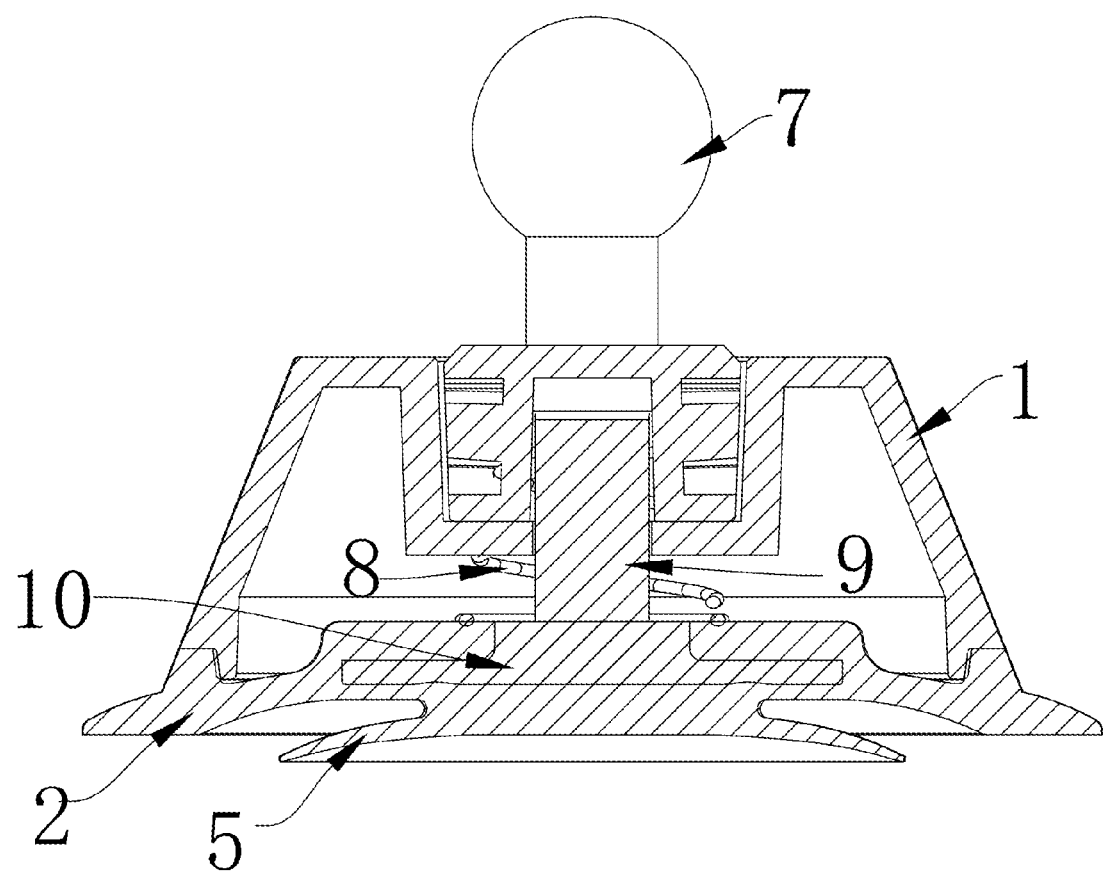
FIG. 5 is a schematic sectional diagram of a front view of the patent of the present disclosure.
Figure 6:
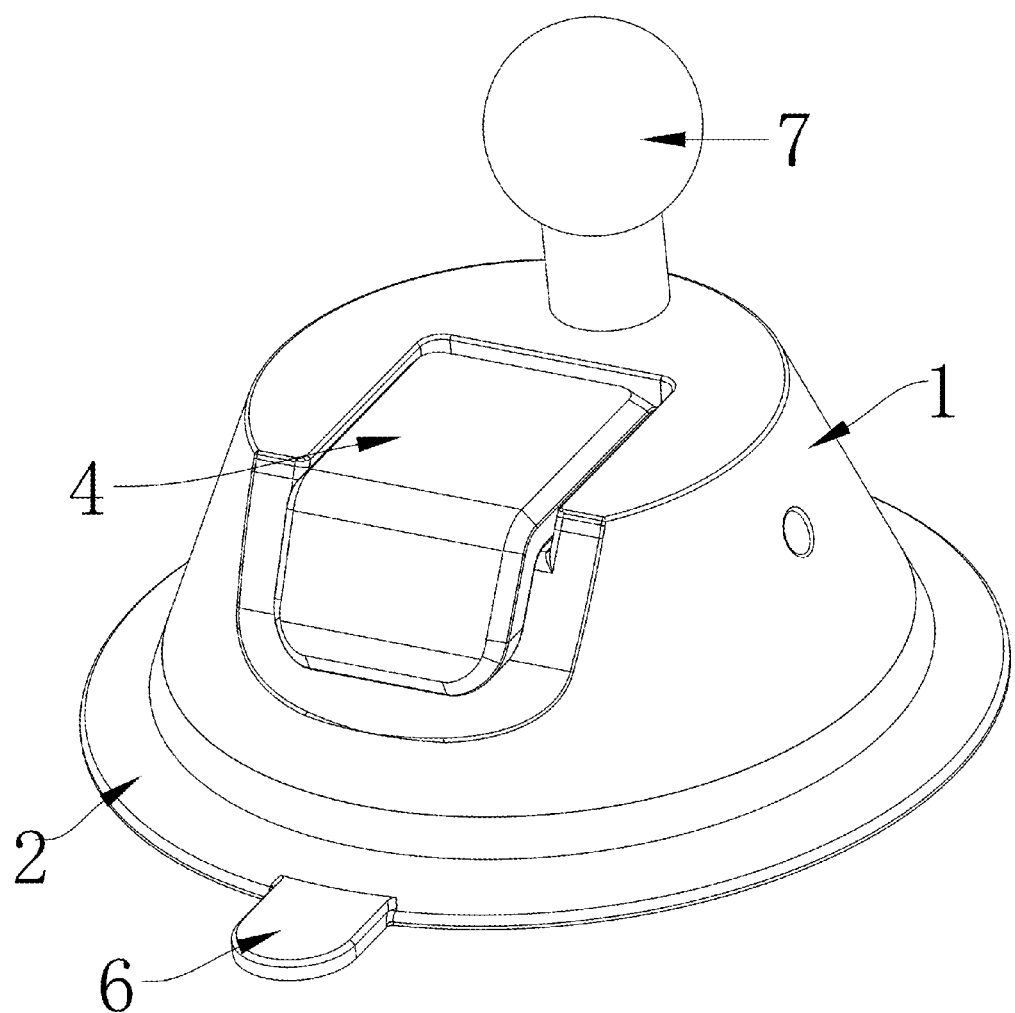
FIG. 6 is a schematic three-dimensional diagram of a front view of the patent of the present disclosure.
Figure 7:
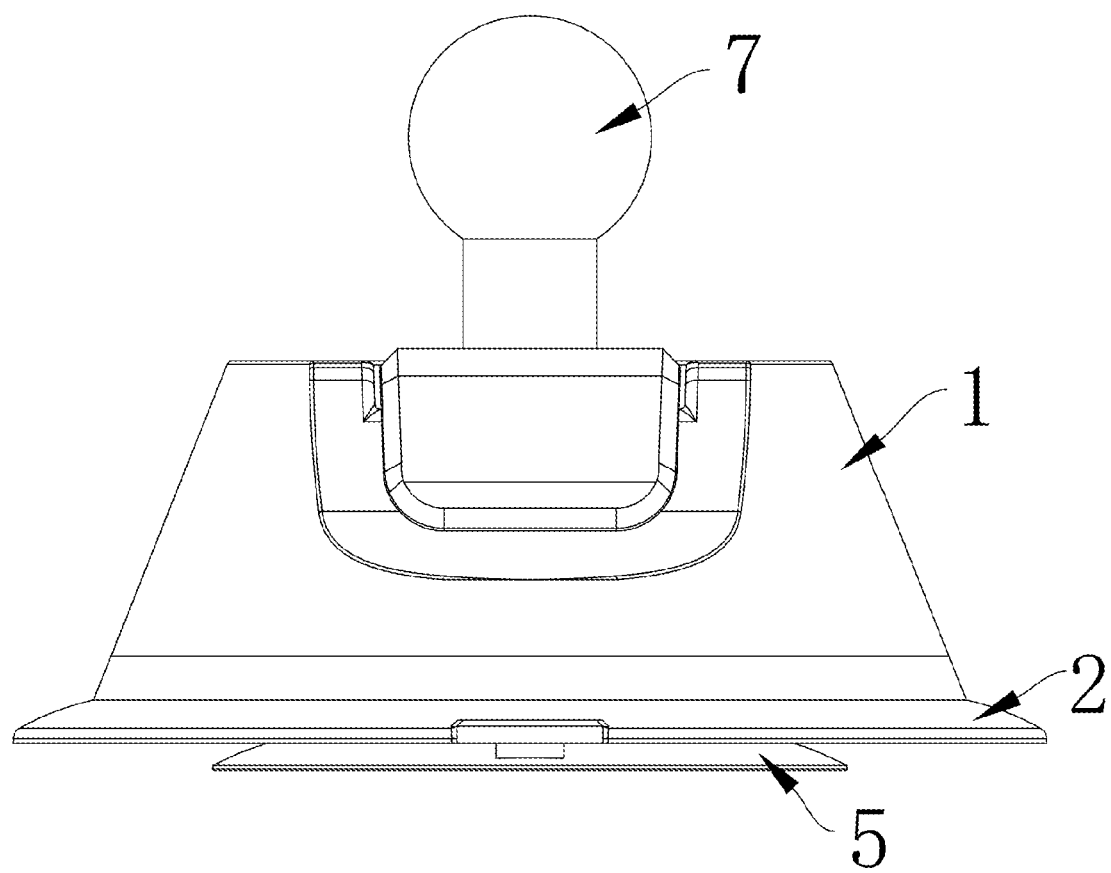
FIG. 7 is a front view of the patent of the present disclosure.
Figure 8:
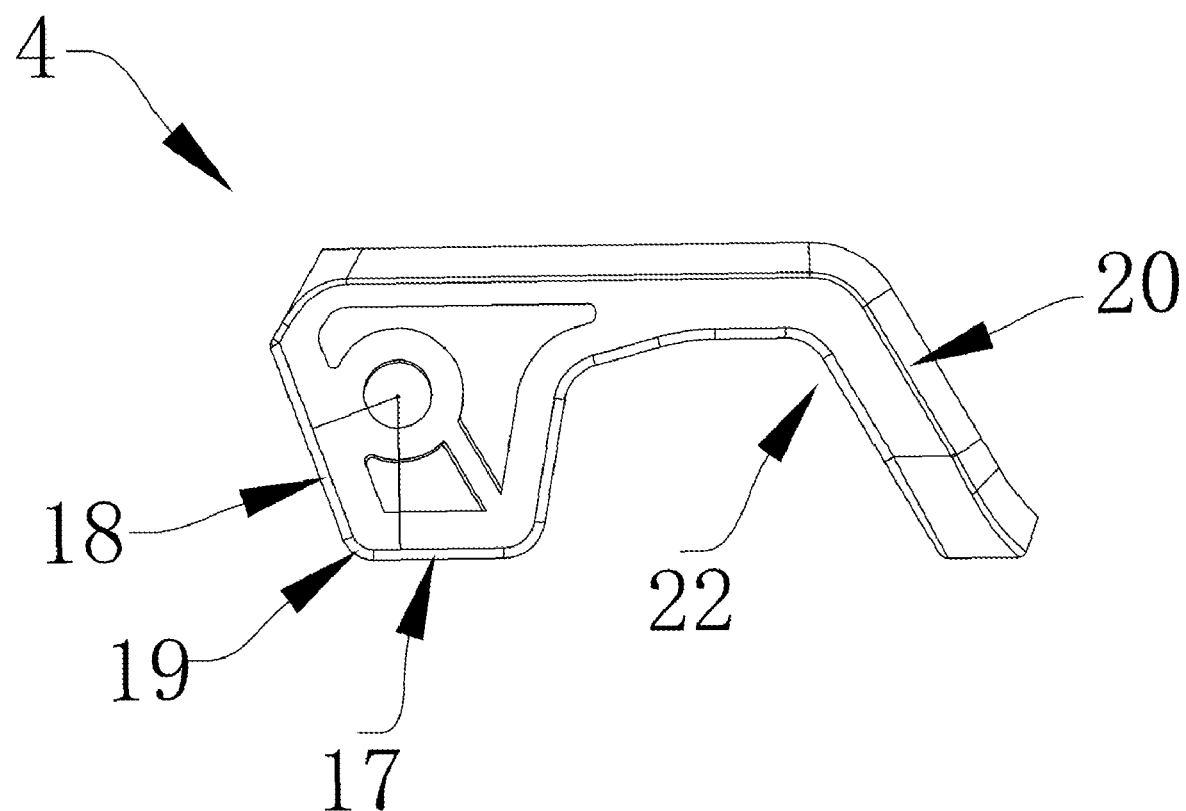
FIG. 8 is a side view of a pressure valve switch of the patent of the present disclosure.
Figure 9:
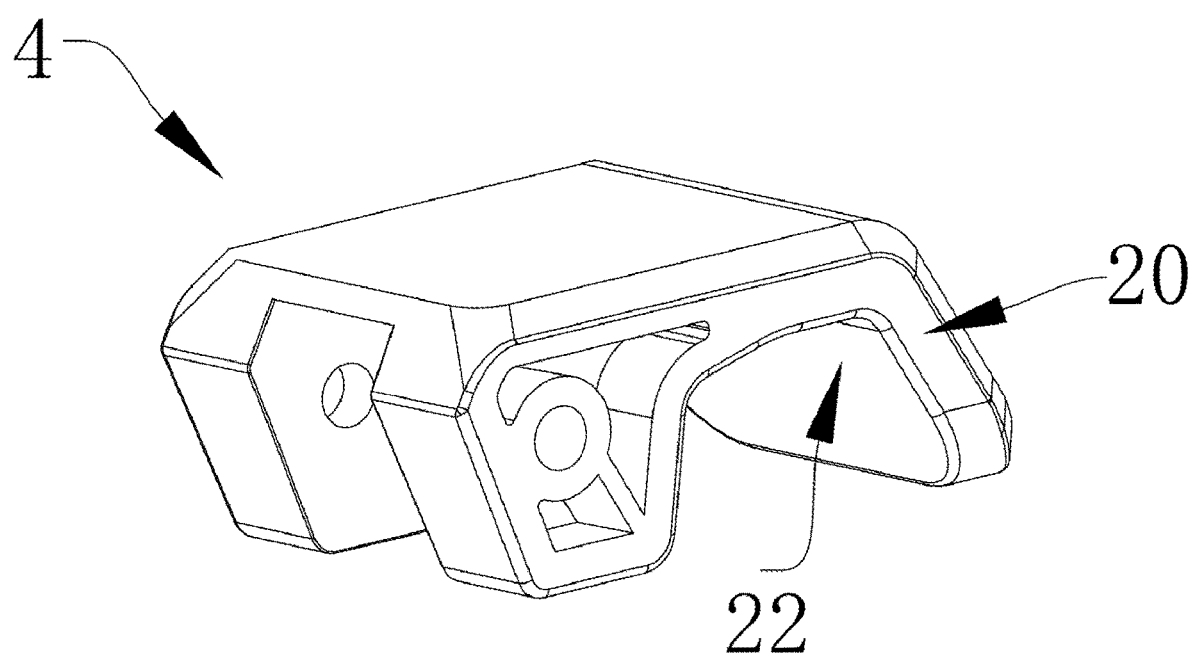
FIG. 9 is a schematic diagram of a three-dimensional view of a pressure valve switch of the patent of the present disclosure.

Referring to FIG. 1 to FIG. 9:

The present disclosure provides a two-suction-cup vehicle-mounted support fixing device, including a mounting seat 1 and a suction cup main body. The mounting seat 1 is inwards sunken to form a built-in cavity used for mounting the suction cup main body. A cylinder channel 3 is formed in an end surface of the mounting seat 1 in a longitudinal direction. A pressure valve switch 4 is arranged in the cylinder channel 3. A periphery of the suction cup main body is embedded into a bottom of the mounting seat 1, and the other end of the suction cup main body extends into the cylinder channel 3 and is hinged with the pressure valve switch 4 through a plug pin 14. The suction cup main body includes an outer suction cup 2 and at least one inner suction cup 5 located on an inner side/bottom of the outer suction cup 2. Pull handles 6 are also arranged on one side of the suction cup main body. A support connector 7 is arranged at one end of the mounting seat 1. Preferably, the support connector 7 is a ball-end connector, which is used for being connected to a mobile phone support through a ball end.

In order to provide an opposite force to suction cups after the suction cups are pulled up, a reset spring 8 is arranged between the suction cup main body and the mounting seat 1.

The suction cup main body further includes a pulling pillar 9 and a pulling disk 10. The pulling pillar 9 is fixedly connected with the pulling disk 10. A disk cavity 11 is also formed in a position, corresponding to the pulling disk 10, on the outer suction cup 2. The pulling disk 10 is embedded into the disk cavity 11. An upper end of the pulling pillar 9 extends into the cylinder channel 3. A first hinge hole 12 is formed in an upper end of the pulling pillar 9. The pressure valve switch 4 is provided with a second hinge hole 13 at a position corresponding to the first hinge hole 12. A plug pin 14 hinges the pressure valve switch 4 with the pulling pillar 9 through the first hinge hole 12 and the second hinge hole 13. The reset spring 8 sleeves the pulling pillar 9. Specifically, an upper end of the reset spring 8 is located on a bottom end surface of the built-in cavity of the mounting seat 1, and a lower end abuts against an end surface of an upper end of the outer suction cup 2.

The outer suction cup 2 is provided with a fixing screw hole in one side close to the pull handle 6. The inner suction cup 5 is provided with a pull handle connecting band 15 at a position corresponding to the fixing screw hole. The pull handle connecting band 15 is formed by extending from a peripheral edge of the inner suction cup 5. A round hole is formed in the pull handle connecting band 15. A screw passes through the round hole and the fixing screw hole to achieve serial connection of the pull handle 6 of the outer suction cup 2 and the inner suction cup 5, to facilitate taking down the outer suction cup 2 and the inner suction cup 5 simultaneously. Actually, the pull handle connecting band 15 of the inner suction cup 5 is equivalent to the pull handle 6 of the outer suction cup 2. When the pull handle 6 of the outer suction cup 2 is pulled with a hand, the outer suction cup 2 is first pulled off. The outer suction cup 2 leaks air for release. The pull handle 6 of the outer suction cup 2 is then continued to be pulled, which will pull up the pull handle connecting band 15, so that the inner suction cup 5 can be pulled up to be released. Specifically, a plurality of inner suction cups 5 can be arranged in the outer suction cup 2. The pull handle connecting bands 15 of the plurality of inner suction cups 5 can be adjustable in length, which can be determined according to distances from the pull handle 6 of the outer suction cup 2.

The pressure valve switch 4 includes a squeeze supporting surface 17 located on one side of the second hinge hole 13, and a raise supporting surface 18 opposite to/crossed with the squeeze supporting surface 17; and a supporting point 19 is formed between the squeeze supporting surface 17 and the raise supporting surface 18. A distance from the squeeze supporting surface 17 to an axis of the second hinge hole 13 is greater than a distance from the raise supporting surface 18 to the axis of the second hinge hole 13. The two-suction-cup vehicle-mounted support fixing device further includes a handle 20 located on the other side of a squeeze region. The mounting seat 1 is provided with a clamping slot 21 in a position corresponding to the handle 20. The handle 20 is provided with a bent portion 22 which can be clamped into the clamping slot 21 in an upper end of the mounting seat 1. A supporting platform 23 for supporting the squeeze supporting surface 17 or the raise supporting surface 18 is also arranged on one side of the cylinder channel, and is located on two sides of an axis of the cylinder channel 3. The pressure valve switch 4 is provided with a pulling slot in a position corresponding to the pulling pillar 9. The pulling pillar 9 is located in the pulling slot. In this way, the pulling pillar 9 is hinged with the pressure valve switch 4. When the pressure valve switch 4 is lifted up, the raise supporting surface 18 just abuts against the supporting platform 23. At this time, the pulling pillar 9 does not lift up the outer suction cup 2. When the handle 20 is squeezed down, due to the lever principle, the handle 20 is squeezed down by taking the supporting point 19 as a brace, until the squeeze supporting surface 17 abuts against the supporting platform 23. Since the distance from the squeeze supporting surface 17 to the second hinge hole 13 is greater than the distance from the raise supporting surface 18 to the second hinge hole 13, that is, the pulling pillar 9 is pulled up, to achieve an effect of pulling the suction cup main body. When the outer suction cup 2 abuts against a surface of a smooth object, and the pulling pillar 9 is pulled up, the outer suction cup 2 can be vacuumized. The outer suction cup 2 is pulled up to also generate a force that drives the inner suction cup 5 to move up. The inner suction cup 5 can also be vacuumized and then can suck the surface of the object. The pull handle 6 is pulled or the handle 20 is lifted up to take down the suction cups.

The above implementations are only the preferred embodiments of the present disclosure and cannot be used to limit the scope of protection of the present disclosure. Any non-substantive changes and replacements made by those skilled in the art fall within the scope claimed by the present disclosure.

What is claimed is:

1. A two-suction-cup vehicle-mounted support fixing device, comprising a mounting seat and a suction cup main body, wherein a cylinder channel is formed in the mounting seat; a pressure valve switch is arranged in the cylinder channel; one end of the suction cup main body is embedded to a bottom of the mounting seat, and the other end of the suction cup main body extends into the cylinder channel and is hinged with the pressure valve switch; the suction cup main body comprises an outer suction cup and at least one inner suction cup located on an inner side of the outer suction cup; a pull handle is also arranged on one side of the suction cup main body; and a support connector is arranged at one end of the mounting seat;

wherein the outer suction cup is provided with a fixing screw hole in one side close to the pull handle; the inner suction cup is provided with a pull handle connecting band at a position corresponding to the fixing screw hole; a round hole is formed in the pull handle connecting band; and a screw passes through the round hole and the fixing screw hole to achieve serial connection of the pull handle of the outer suction cup and the inner suction cup, to facilitate taking down the outer suction cup and the inner suction cup simultaneously.

2. The two-suction-cup vehicle-mounted support fixing device according to claim 1, wherein the support connector is a ball-end connector.

3. The two-suction-cup vehicle-mounted support fixing device according to claim 1, wherein the suction cup main body further comprises a pulling pillar and a pulling disk; the pulling pillar is fixedly connected with the pulling disk; a disk cavity is also formed in a position, corresponding to the pulling disk, on the outer suction cup; the pulling disk is embedded into the disk cavity; an upper end of the pulling pillar extends into the cylinder channel; a first hinge hole is formed in an upper end of the pulling pillar; the pressure valve switch is provided with a second hinge hole at a position corresponding to the first hinge hole; a plug pin hinges the pressure valve switch with the pulling pillar through the first hinge hole and the second hinge hole; and a reset spring sleeves the pulling pillar.

4. The two-suction-cup vehicle-mounted support fixing device according to claim 1, wherein an upper end of the suction cup main body is provided with a reset spring which is located at a lower end of the mounting seat.

5. The two-suction-cup vehicle-mounted support fixing device according to claim 3, wherein the pressure valve switch comprises a squeeze supporting surface located on one side of the second hinge hole, and a raise supporting surface opposite to the squeeze supporting surface; a supporting point is formed between the squeeze supporting surface and the raise supporting surface; and a distance from the squeeze supporting surface to an axis of the second hinge hole is greater than a distance from the raise supporting surface to the axis of the second hinge hole.

6. The two-suction-cup vehicle-mounted support fixing device according to claim 5, further comprising a handle located on the other side of a squeeze region; the mounting seat is provided with a clamping slot in a position corresponding to the handle; the handle is provided with a bent portion which is clamped into the clamping slot in an upper end of the mounting seat; and a supporting platform for supporting the squeeze supporting surface or the raise supporting surface is also arranged on one side of the cylinder channel, and is located on two sides of an axis of the cylinder channel.

* * * * *